(12) United States Patent
Konaka

(10) Patent No.: US 11,670,978 B2
(45) Date of Patent: Jun. 6, 2023

(54) STATOR OF ELECTRIC MOTOR HAVING COOLING TUBE

(71) Applicant: Fanuc Corporation, Yamanashi (JP)

(72) Inventor: Yuudai Konaka, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 212 days.

(21) Appl. No.: 17/030,589

(22) Filed: Sep. 24, 2020

(65) Prior Publication Data

US 2021/0126499 A1 Apr. 29, 2021

(30) Foreign Application Priority Data

Oct. 25, 2019 (JP) .............................. JP2019-194359

(51) Int. Cl.
*H02K 1/32* (2006.01)
*H02K 9/19* (2006.01)
*H02K 9/197* (2006.01)

(52) U.S. Cl.
CPC .............. *H02K 1/32* (2013.01); *H02K 9/197* (2013.01)

(58) Field of Classification Search
CPC ............ H02K 9/19; H02K 1/32; H02K 9/197; H02K 1/20
USPC .......................................................... 310/54
See application file for complete search history.

(56) References Cited

U.S. PATENT DOCUMENTS

| | | | | |
|---|---|---|---|---|
| 3,168,817 A * | 2/1965 | Beckman | ................ | F17C 3/02 220/592.27 |
| 6,789,305 B2 * | 9/2004 | Seki | ........................ | H02K 3/24 29/605 |
| 7,545,060 B2 * | 6/2009 | Ward | ..................... | H02K 9/197 310/260 |
| 7,589,441 B2 * | 9/2009 | Kalsi | ...................... | H02K 9/223 310/180 |
| 7,952,240 B2 * | 5/2011 | Takenaka | ................. | H02K 1/20 310/58 |
| 8,937,414 B2 * | 1/2015 | Song | ....................... | H02K 9/19 310/410 |
| 8,970,073 B2 * | 3/2015 | Miyamoto | ............ | H02K 5/203 310/58 |
| 9,768,666 B2 * | 9/2017 | Büttner | ................... | H02K 1/20 |
| 2013/0285485 A1 * | 10/2013 | Song | .................... | B60L 3/0061 310/53 |
| 2015/0280526 A1 * | 10/2015 | Chamberlin | .......... | H02K 9/223 310/54 |

FOREIGN PATENT DOCUMENTS

| JP | 09140097 A | 5/1997 |
|---|---|---|
| JP | 10336965 A | 12/1998 |
| JP | 2003009436 A | 1/2003 |
| JP | 2004048939 A | 2/2004 |
| JP | 2006325369 A | 11/2006 |
| JP | 2009033898 A | 2/2009 |
| JP | 2013158237 A | 8/2013 |
| JP | 2017052387 A | 3/2017 |
| JP | 2017085765 A | 5/2017 |

* cited by examiner

Primary Examiner — Alex W Mok
(74) Attorney, Agent, or Firm — RatnerPrestia

(57) ABSTRACT

A stator of an electric motor includes a cylindrical stator core, a winding wound around the stator core, and a first cooling tube wound around a coil end formed in an axial end portion of the stator core.

12 Claims, 6 Drawing Sheets

STATOR OF ELECTRIC MOTOR HAVING COOLING TUBE

CROSS-REFERENCE TO RELATED APPLICATIONS

This application is a new U.S. Patent Application that claims benefit of Japanese Patent Application No. 2019-194359, filed Oct. 25, 2019, the disclosure of which is incorporated herein by reference in its entirety for all purposes.

BACKGROUND OF THE INVENTION

1. Field of the Invention

The present invention relates to an electric motor, and more particularly to a stator of an electric motor having a cooling tube.

2. Description of the Related Art

Temperature rises due to heat generated by windings and iron loss of a stator core directly cause performance deterioration of an electric motor. Therefore, how to radiate heat of a stator such as a winding or a stator core is an important issue. As a method for removing heat generated by the stator, a structure in which a cooling jacket is provided on a stator core outer periphery, a structure in which a cooling path is provided on the stator core, a structure in which a cooling path is provided on a coil end, and the like are known. As such prior art, the literature described below is known.

Japanese Unexamined Patent Publication (Kokai) No. 09-140097 discloses a plurality of cooling tubes provided so as to penetrate in an axial direction and circumferentially arranged side by side in an outer peripheral region of stator windings inside a stator iron core.

Japanese Unexamined Patent Publication (Kokai) No. 10-336965 discloses a cooling jacket fitted into a stator iron core, wherein a plurality of helical cooling water passages are provided inside a cylinder of the cooling jacket.

Japanese Unexamined Patent Publication (Kokai) No. 2003-009436 discloses a refrigerant passage formed inside a slot of a stator core in which a coil is accommodated by closing a slot opening which opens in a stator inner peripheral surface.

Japanese Unexamined Patent Publication (Kokai) No. 2004-048939 discloses a substantially rectangular cross-sectional liquid cooling tube provided in close contact with a head-side coil end and an end-side coil end.

Japanese Unexamined Patent Publication (Kokai) No. 2006-325369 discloses a cooling tube made of a non-magnetic heat-resistant material disposed annularly at an axial end portion of a stator around a circumference of a rotor shaft, wherein the cooling tube passes through a central portion of a cross section of a coil end.

Japanese Unexamined Patent Publication (Kokai) No. 2009-033898 discloses a cooling pipe located in a stator axial direction central portion of a stator.

Japanese Unexamined Patent Publication (Kokai) No. 2013-158237 discloses a cooling bore extending through a laminate stack.

Japanese Unexamined Patent Publication (Kokai) No. 2017-085765 discloses that a through hole is provided in a hollow fixing material fixed at equal intervals in a circumferential direction on an outer peripheral surface of a stator iron core and the through hole functions as a cooling passage for flowing a cooling medium.

Japanese Unexamined Patent Publication (Kokai) No. 2017-052387 discloses a refrigerant supply device comprising a first cooling tube for discharging a cooling medium from a mechanical pump from a first discharge port to a coil end side, and a second cooling tube for discharging the cooling medium from an electric pump from a second discharge port to the coil end side.

SUMMARY OF THE INVENTION

In the structure in which a cooling jacket is provided on the stator core outer periphery, since the stator core requires a predetermined thickness in a radial direction, there is a distance from the cooling jacket to the windings, whereby cooling efficiency is poor. Further, with the cooling jacket, a coil end formed in an axial end portion of the stator core is not substantially cooled. Conversely, in the structure in which the cooling path is provided in a slot of the stator core, since the space factor of the winding in the slot is reduced, performance of the electric motor may be reduced.

Therefore, a technique for efficiently removing the heat generated by a stator without lowering the performance of the electric motor is required.

An aspect of the present disclosure provides a stator of an electric motor comprising a cylindrical stator core, a winding wound around the stator core, and a first cooling tube wound around a coil end formed at an axial end portion of the stator core.

DETAILED DESCRIPTION

Figure 1:
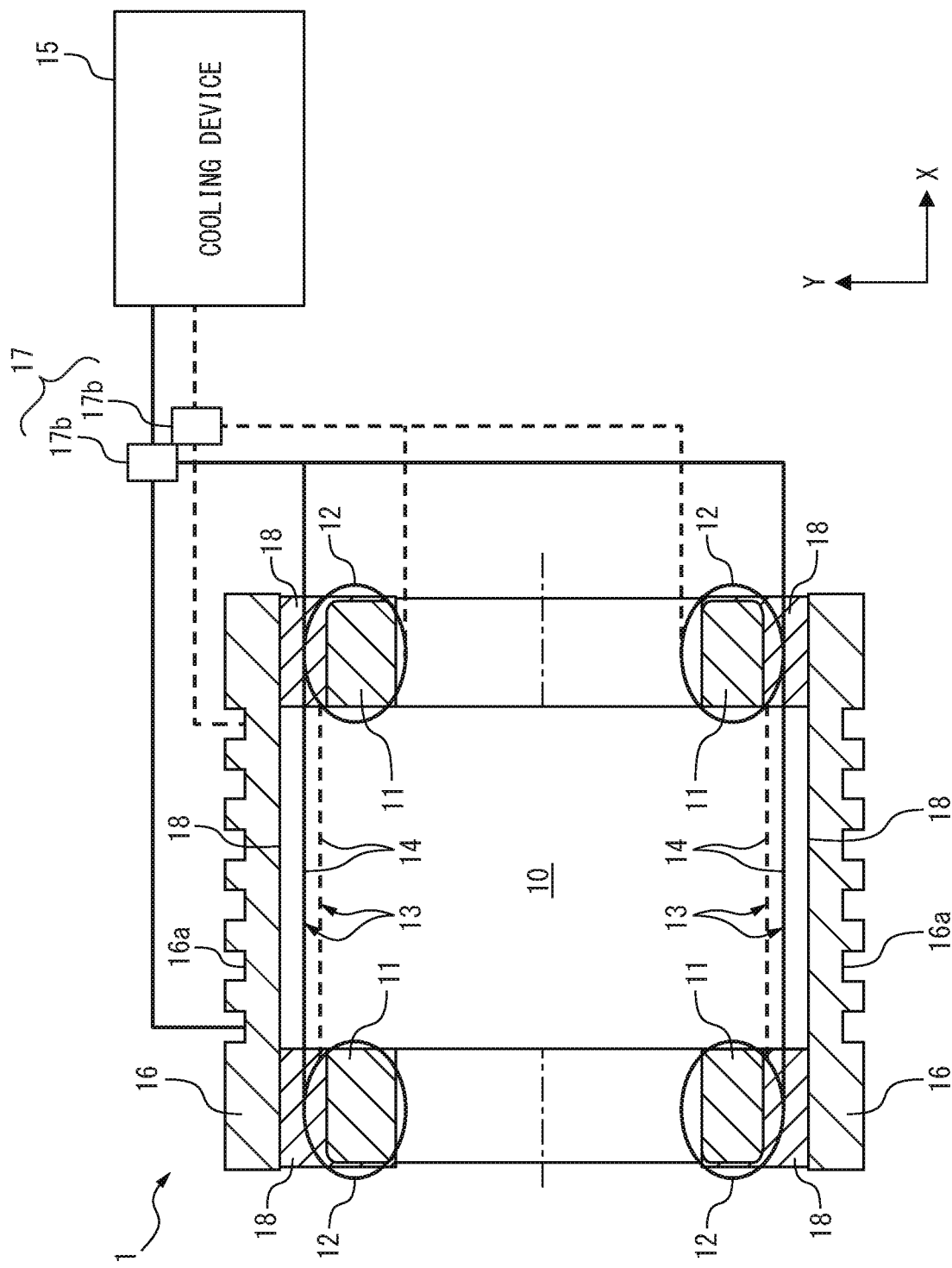
FIG. 1 is a cross-sectional view of a stator of an electric motor according to an embodiment.

The embodiments of the present disclosure will be described in detail below with reference to the attached drawings. In the drawings, identical or similar constituent elements are assigned the same or similar reference signs. Furthermore, the embodiments described below do not limit the technical scope of the invention or the definitions of terms described in the claims. It should be noted that, as used herein, the term "input side" means the power line side of an electric motor and the term "output side" means the output shaft side of the electric motor.

FIG. 1 shows a stator 1 of the electric motor of the present embodiment. The stator 1 of this example is, for example, a stator for a spindle motor, but this may be applied to other types of electric motors in which a winding is wound around a stator. The stator 1 includes a cylindrical stator core 10, a winding 11 wound around the stator core 10, and a first cooling tube 12 wound around at least one of coil ends formed on axial end portions of the stator core 10 in an axial direction X. Furthermore, the stator 1 may include through holes 13 which are bored in the stator core 10 in the axial direction X, and a second cooling tube 14 which is inserted into the through holes 13. Refrigerant is supplied from a cooling device 15 to the first cooling tubes 12 and the second cooling tube 14. Heat generated at the coil end is removed by refrigerant flowing through the first cooling tubes 12, and the heat generated in the stator core 10 is removed by the refrigerant flowing through the second cooling tube 14. The first cooling tube 12 and the second cooling tube 14 may be formed of separate tubes or may be formed of a series of tubes.

Furthermore, the stator 1 may include a cooling jacket 16 disposed in a circumferential direction outer peripheral portion of the stator core 10. The cooling jacket 16 is formed of a magnetic material or the like so as to nave a helical cooling groove 16a on an outer circumferential surface, and is fixed to the stator core 10 by, for example, shrink fitting or the like. The refrigerant to be supplied to the cooling jacket 16, and the refrigerant to be supplied to the first cooling tube 12 and the second cooling tube 14 may be shared. The stator 1 can use a branch joint 17 for the shared refrigerant. The branch joint 17 may include a supply-side branch joint 17a and a discharge-side branch joint 17b.

The stator 1 may include a thermally conductive resin 18 filled in gaps formed by the stator core 10, the winding 11, and the cooling jacket 16. For example, the gaps include a gap between the stator core 10 and the cooling jacket 16, gaps between the through holes 13 of the stator core 10 and the second cooling tube 14, gaps between the slots of the stator core 10 (see FIG. 4.) and the winding 11, and the like. The thermally conductive resin 18 may be a molded resin or may be an impregnated resin impregnated into the gaps. Further, in order to improve the thermal conductivity, the thermally conductive resin 18 may be provided with a thermally conductive filler interchained in a matrix resin. As the thermally conductive filler, for example, aluminum nitride, magnesium oxide, boron nitride, alumina, anhydrous magnesium carbonate, silicon oxide, zinc oxide, or the like may be used.

Figure 2:
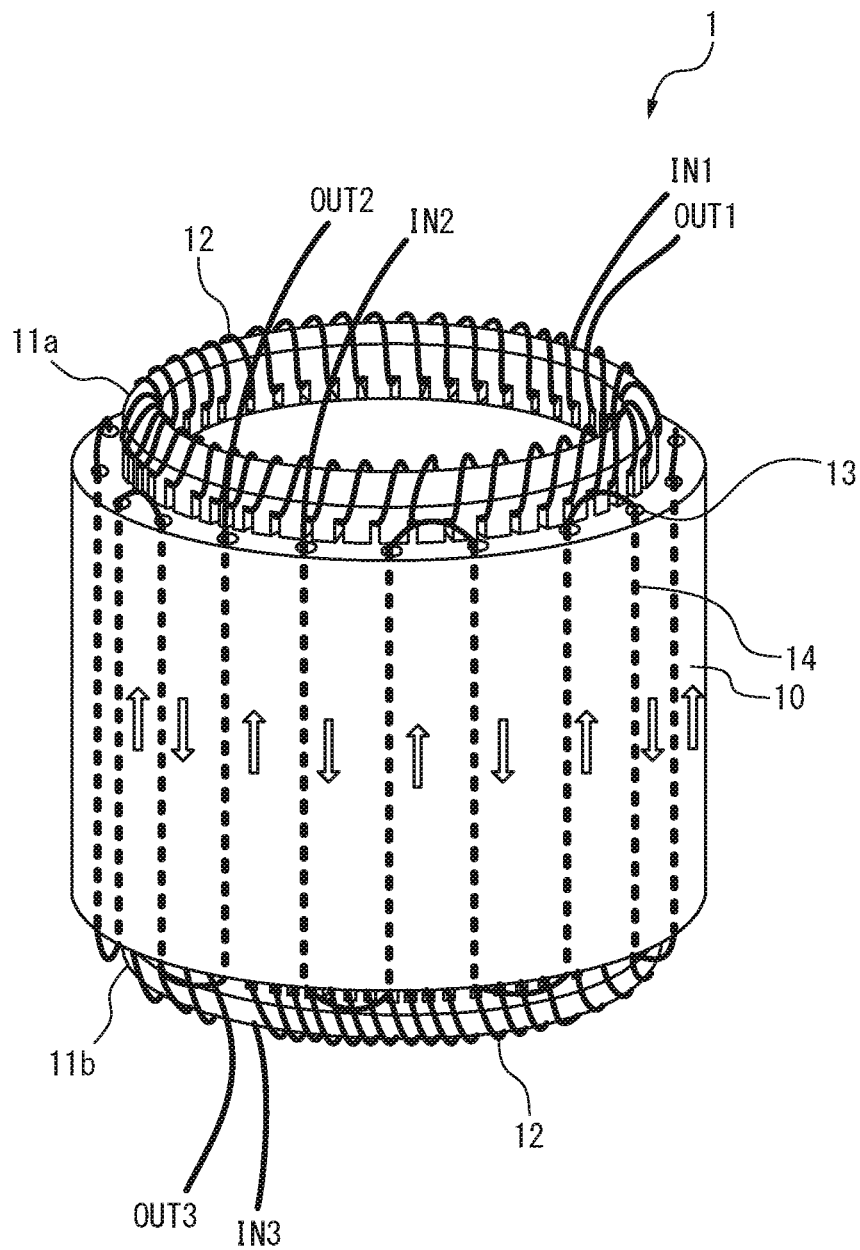
FIG. 2 is a perspective view of the stator in which a first cooling tube and a second cooling tube, which are formed of separate tubes, are arranged.

FIG. 2 shows the stator 1 in which the first cooling tubes 12 and the second cooling tube 14 are formed of separate tubes. The stator 1 includes two first cooling tubes 12 and a second cooling tube 14. The first cooling tube 12 at the coil end 11a on the input side has an inlet IN1 and an outlet OUT1, and the first cooling tube 12 at the coil end 11b on the output side has an inlet IN3 and an outlet OUT3. Further, the second cooling tube 14 inserted into the through holes 13 of the stator core 10 has an inlet IN2 and an outlet OUT2. One of the two types of separate tubes, i.e., the first cooling tubes 12, enter the coil end 11a and the coil end 11b and exits the coil end 11a and the coil end 11b, respectively, and the other type of tube (the second cooling tube 14) enters the stator core 10 and exits the stator core 10. By forming the first cooling tubes 12 and the second cooling tube 14 of separate tubes, it is possible to easily perform an installation operation of the cooling tubes during manufacturing.

Figure 3:
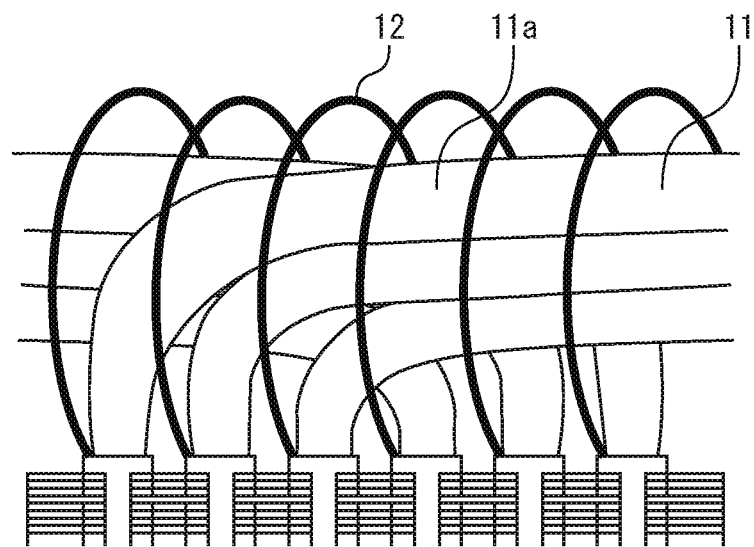
FIG. 3 is an enlarged view of a coil end around which the first cooling tube is helically wound.

FIG. 3 is an enlarged view of the coil end 11a around which the first cooling tube 12 is helically wound. The first cooling tube 12, which is helically wound around the bundle of the winding 11 located at the coil end 11a, has both a function of cooling the coil end 11a that generates heat and a function of tightening the bundle of the winding 11 located at the coil end 11a and maintaining the shape of the winding 11. In order to realize the cooling function and the tightening function without impairing the performance of the electric motor, the first cooling tube 12 is preferably formed of a material having properties such as electrical insulation, heat resistance, and flexibility. As the flexible material, for example, a soft resin such as a fluororesin or a urethane resin is suitable.

Figure 4:
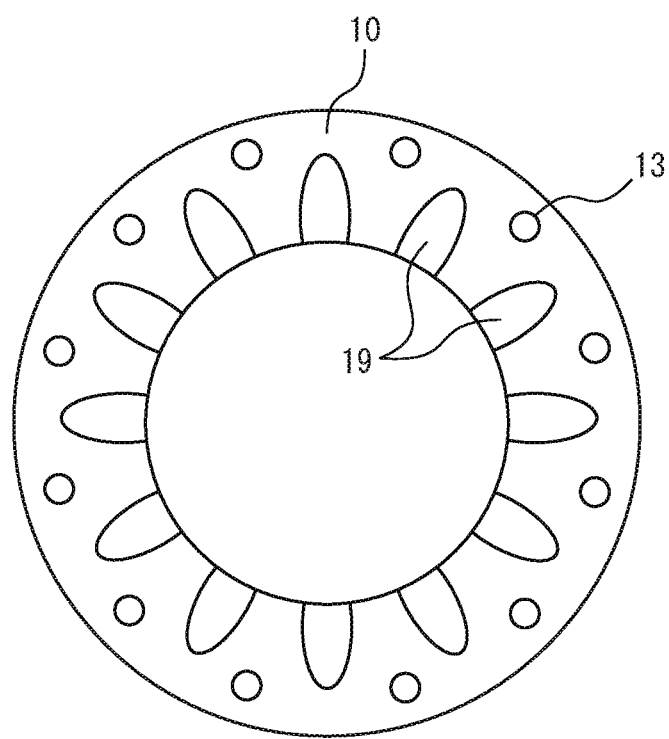
FIG. 4 is a plan view of a stator core showing an arrangement of through holes for inserting the second cooling tube.

FIG. 4 shows an arrangement of the through holes 13 for inserting the second cooling tube. The stator core 10 includes a plurality of slots 19 formed with predetermined intervals in a circumferential direction inner peripheral portion and, for example, the winding 11 is wound for every three consecutive slots 19. So as not to affect the magnetic flux electromagnetically induced by the winding 11, the through holes 13 may be formed in intermediate portions of the adjacent slots 19, and in the vicinity of an outer peripheral portion of the stator core 10. A plurality of through holes 13 are arranged substantially in the same distance position in a radial direction Y of the stator core 10. The second cooling tube inserted into the through holes 13 may be formed of a material having properties such as electrical insulation and heat resistance (for example, a metal, a resin, or the like), and may not necessarily be a soft material.

Referring again to FIG. 1, in the stator 1 having the first cooling tubes 12 and the second cooling tube 14, in order to prevent condensation by the refrigerant flowing through these cooling tubes, before supplying the refrigerant to the cooling tubes, the temperature of the refrigerant may be controlled to a temperature higher than the dew point. Thus, it is possible to prevent corrosion and short-circuiting in the winding 11 or the like in advance.

Figure 5:
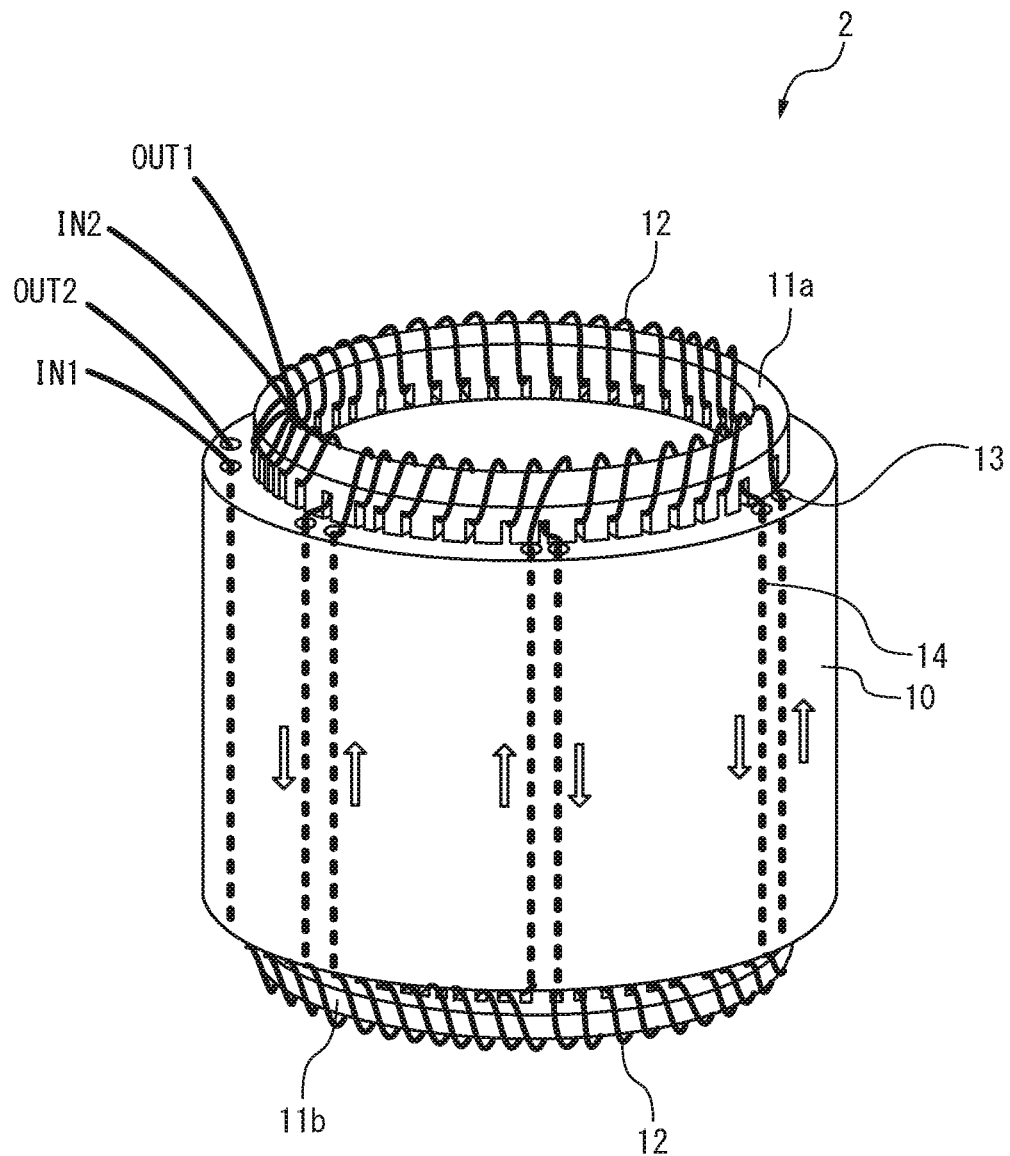
FIG. 5 is a perspective view of a stator in which the first cooling tube and the second cooling tube, which are formed of a series of tubes, are arranged.

FIG. 5 shows a stator 2 in which the first cooling tube 12 and the second cooling tube 14 are formed of a series of tubes. The stator 2 of this example is a modification of the stator 1 shown in FIG. 2, and a series of tubes (the first cooling tube 12 and the second cooling tube 14) extend from and to the coil end 11a and the coil end 11b through the stator core 10. The stator 2 of this example comprises two series of tubes, and the two series of tubes alternately extend from and to the coil end 11a and the coil end 11b through the stator core 10 and have two inlets IN1-IN2 and outlets OUT1-OUT2. By forming the first cooling tube 12 and the second cooling tube 14 of a series of tubes, the inlets IN1-IN2 and the outlets OUT1-OUT2 of the cooling tube are collected together on the input side or the output side of the electric motor. Thus, it is possible to make the arrangement space for the cooling tubes relatively small.

In the embodiment shown in FIGS. 2 and 5, the inlets IN1 and IN2 of the separate tubes or the series of tubes may be located on the output side of the electric motor. Thus, since cool refrigerant is supplied first to the output side, which easily generates heat, it is possible to further increase cooling efficiency.

Figure 6:
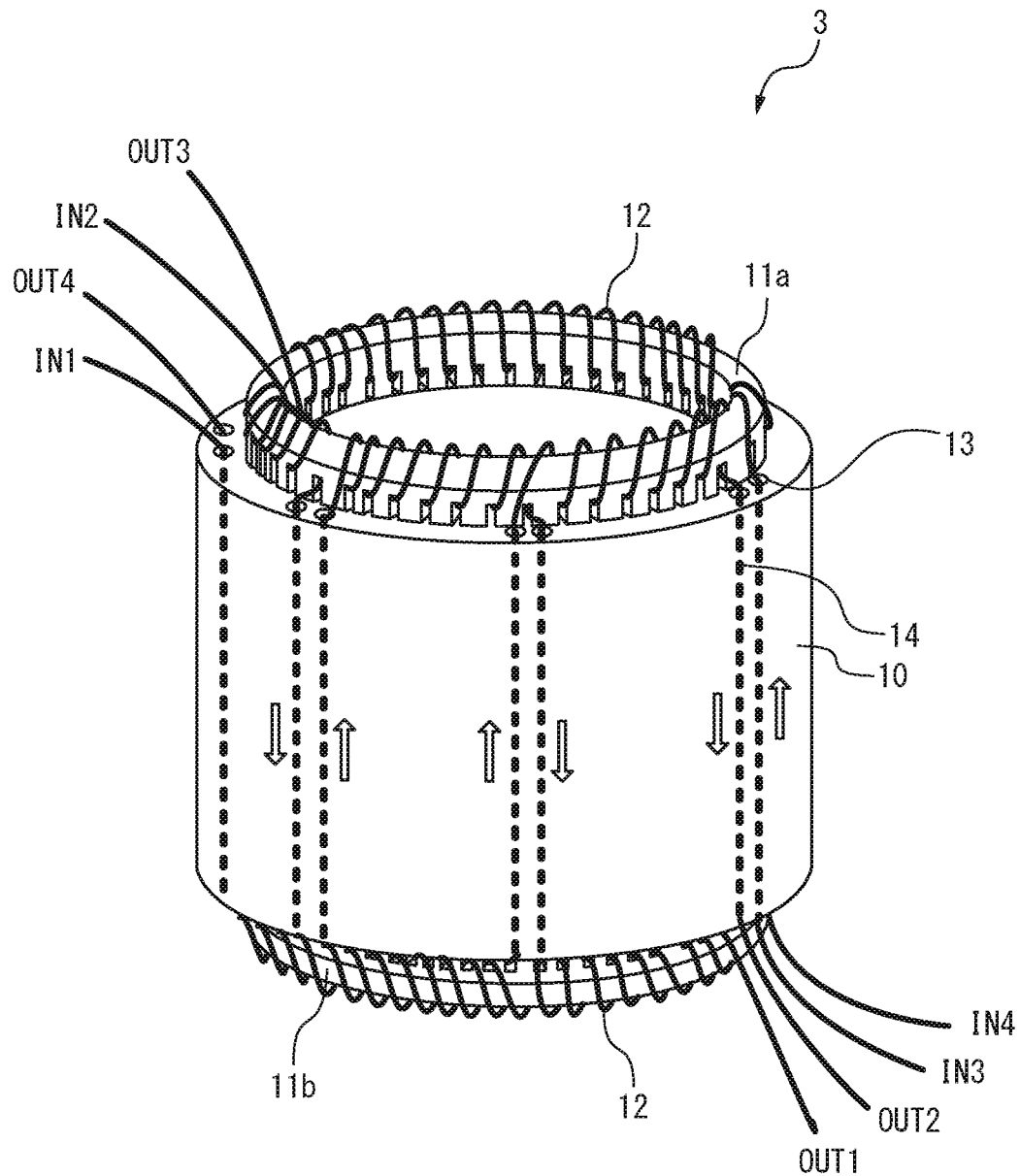
FIG. 6 is a perspective view of a stator in which a plurality of inlets and outlets of a cooling tube are arranged at predetermined intervals in a circumferential direction.

FIG. 6 shows a stator 3 in which a plurality of inlets and outlets of the first cooling tube 12 or the second cooling tube 14 are arranged at predetermined intervals in the circumferential direction of the stator core 10. The stator 3 of this example is a modification of the stator 2 shown in FIG. 5, and four tubes alternately extend from and to the coil end 11a and the coil end 11b through the stator core 10 and have four inlets IN1-IN4 and outlets OUT1-OUT4. The inlets IN1-IN2 of the two tubes are arranged at a position of, for example, 0° in the circumferential direction, and the inlets IN3-IN4 of the two tubes are arranged at a position of, for example, 180° in the circumferential direction. Thus, since the cool refrigerant is supplied every 180°, it is possible to improve the cooling performance of the stator 3.

Figure 7:
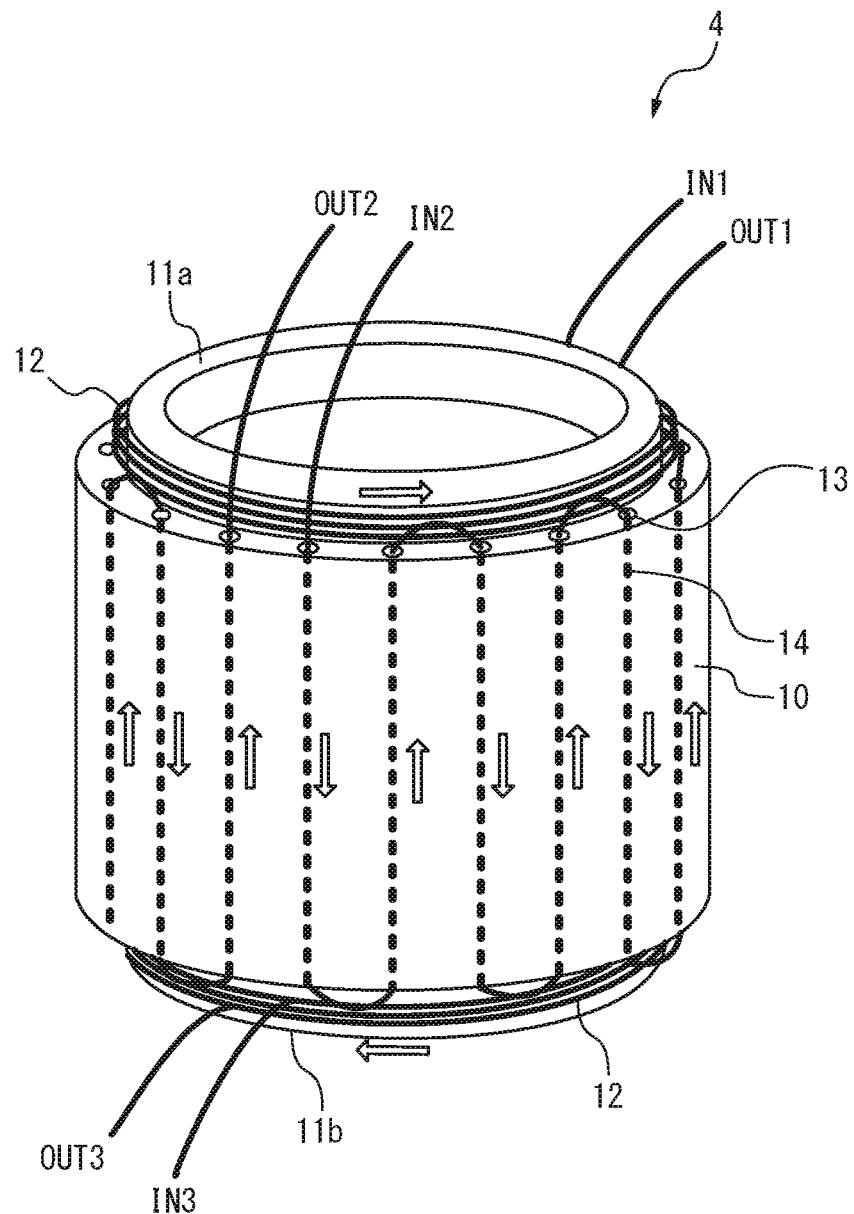
FIG. 7 is a perspective view of a stator around which the first cooling tube is wound along the coil end in a circumferential direction.

FIG. 7 shows a stator 4 around which the first cooling tubes 12 are wound along the coil ends 11*a* and 11*b* in the circumferential direction. The stator 4 of this example is a modification of the stator 1 shown in FIG. 2, and the first cooling tubes 12 and the second cooling tube 14 are formed of separate tubes. The first cooling tubes 12 of this example are different from those of the aforementioned stator in that the first cooling tubes 12 are wound in the circumferential direction along the bundle of the winding located at the coil ends 11*a* and 11*b* on the input side and the output side. Although the first cooling tubes 12 are wound around the outer peripheries of the coil ends 11*a* and 11*b*, the first cooling tubes 12 may be wound around the inner peripheries of the coil ends 11*a* and 11*b*. The first cooling tubes 12 have both a function of cooling the coil ends 11*a* and 11*b* that generate heat and a function of tightening the bundle of the winding 11 at the coil ends 11*a* and 11*b* and maintaining the shape of the winding 11.

According to the above embodiment, since the first cooling tubes 12 are wound around the coil ends 11*a* and 11*b*, it is possible to efficiently remove the heat generated in the stator 1. Further, the first cooling tubes 12 can also have a tightening function for maintaining the shape of the winding 11.

While various embodiments have been described herein, it should be appreciated that the invention is not limited to the embodiments described above, and that various modifications may be made within the scope described in the following claims.

The invention claimed is:

1. A stator of an electric motor comprising:
a cylindrical stator core;
a winding wound around the stator core; and
a first cooling tube wound around a coil end formed on an axial end portion of the stator core;
a through hole bored axially in the stator core; and
a second cooling tube inserted in the through hole,
wherein the first cooling tube and the second cooling tube are formed of separate tubes or of a series of tubes, and
wherein the series of tubes extend from and to the coil end and the stator core and inlets and outlets of the series of tubes are collected together on an input side or an output side of the electric motor.

2. The stator of an electric motor according to claim 1, wherein the first cooling tube is helically wound around a bundle of the winding located at the coil end or wound in a circumferential direction along the bundle of the winding located at the coil end.

3. The stator of an electric motor according to claim 1, wherein the first cooling tube tightens the bundle of the winding located at the coil end and maintains the shape of the winding.

4. The stator of an electric motor according to claim 1, wherein the first cooling tube is formed of a flexible material.

5. The stator of an electric motor according to claim 1, further comprising a plurality of slots formed with predetermined intervals on an inner peripheral portion of the stator core, wherein the through hole is formed in an intermediate portion of adjacent slots and in the vicinity of an outer peripheral portion of the stator core.

6. The stator of an electric motor according to claim 1, wherein the first cooling tube and the second cooling tube are formed of separate tubes or of a series of tubes.

7. The stator of an electric motor according to claim 6, wherein one of the separate tubes enters the coil end and exits the coil end, and another of the separate tubes enters the stator core and exits the stator core.

8. The stator of an electric motor according to claim 6, wherein inlets of the separate tubes or the series of tubes are arranged on an output side of the electric motor.

9. The stator of an electric motor according to claim 1, wherein a plurality of inlets and outlets of the first cooling tube or the second cooling tube are arranged at predetermined intervals in a circumferential direction of the stator core.

10. The stator of an electric motor according to claim 1, further comprising a cooling jacket disposed on the outer peripheral portion of the stator core, wherein refrigerant supplied to the cooling jacket and refrigerant supplied to at least one of the first cooling tube and the second cooling tube are shared.

11. The stator of an electric motor according to claim 10, further comprising a thermally conductive resin filled in gaps formed by the stator core, the winding, and the cooling jacket.

12. The stator of an electric motor according to claim 11, wherein the thermally conductive resin is a molded resin or an impregnated resin.

\* \* \* \* \*